United States Patent [19]

Allen

[11] Patent Number: 5,477,506
[45] Date of Patent: Dec. 19, 1995

[54] IN-FLOW ACOUSTIC SENSOR

[75] Inventor: Christopher S. Allen, Mountain View, Calif.

[73] Assignee: The United States of America as represented by the Administrator of the National Aeronautics and Space Administration, Washington, D.C.

[21] Appl. No.: 149,896

[22] Filed: Nov. 10, 1993

[51] Int. Cl.⁶ .................................. H04R 23/00
[52] U.S. Cl. .................. 367/140; 367/901; 367/906; 181/153; 181/400; 381/91; 73/649; 73/861.18
[58] Field of Search ...................... 367/906, 901, 367/140; 73/649, 861.18; 381/87, 91, 205; 181/153, 400

[56] References Cited

U.S. PATENT DOCUMENTS

| | | | |
|---|---|---|---|
| 2,965,878 | 12/1960 | Öhlund | 367/906 |
| 3,476,208 | 11/1969 | Sellman et al. | 367/906 |
| 3,914,997 | 10/1975 | Pinckney | 73/182 |
| 4,527,419 | 7/1985 | Dimeff et al. | 73/661 |
| 4,811,309 | 3/1989 | Eriksson et al. | 367/140 |
| 4,903,249 | 2/1990 | Hoops et al. | 367/140 |
| 4,980,873 | 12/1990 | Gross et al. | 367/181 |
| 5,293,353 | 3/1994 | Mestas et al. | 367/157 |
| 5,339,287 | 8/1994 | Bauer | 367/140 |

FOREIGN PATENT DOCUMENTS

1578241  8/1971  Germany.

*Primary Examiner*—J. Woodrow Eldred
*Attorney, Agent, or Firm*—Kenneth L. Warsh; Guy Miller; John G. Mannix

[57] ABSTRACT

An acoustic sensor for measuring acoustic waves contained in fluid flow flowing over the sensor. The acoustic sensor reduces any unwanted self-noise associated with the flowing fluid by providing a nose cone having proper aerodynamic properties and by positioning the diaphragm of a microphone of the sensor at a location where any unwanted noise is at a relatively low level. The nose cone has a rounded, blunt or even sharp tip neither of which creates any major disturbances in the flowing fluid which it intercepts.

4 Claims, 6 Drawing Sheets

IN-FLOW ACOUSTIC SENSOR

ORIGIN OF THE INVENTION

The invention described herein was made in the performance of work under a NASA contract and is subject to the provision of Section 305 of the National Aeronautics and Space Act of 1958, Public Law 85-568 (72 Stat. 435;42 U.S.C. 2457).

BACKGROUND OF THE INVENTION

A. Technical Field of Field of the Invention

This invention relates to the field of measuring acoustic waves within a fluid flow, and more particularly, to an acoustic sensor for measuring acoustic waves within a fluid flow while at the same time having means to eliminate unwanted noise that would otherwise interfere with the desired measurement and which noise is typically created by the acoustic sensor being inserted into the fluid flow.

B. Description of the Prior Art

In the field of measuring acoustic waves within fluid flows, it is important that the insertion of a probe or sensor into the fluid flow does not unnecessarily disturb the freestream value of the static pressure of the fluid. Freestream static pressure, which is steady in time, is the flow value of the fluid pressure in its undisturbed state. Acoustic waves posses acoustic pressures which are not steady in time but rather are time variable static pressures that increase and decrease about the freestream static pressure. Further, it is important that the measurement of the acoustic waves not be hindered by any noise that may be created by the insertion of the sensor into the fluid flow. It is desireable for the freestream static pressure to remain constant because any variation will be interpreted by the acoustic sensor as noise.

U.S. Pat. No. 3,914,997 ('997) of Pinckney issued Oct. 28, 1975, herein incorporated by reference, discloses a static pressure probe used in supersonic airflow to measure the static and the total pressure at the point of probe insertion. The '997 patent discloses a probe that is smaller in size relative to prior art devices. The probe of the '997 patent has three separate sections which allow the flow to occur at approximately the freestream static pressure at designated pressure ports along the length of the probe which are located approximately three (3) probe diameters as measured downstream from the tip of the probe itself. The probe of the '997 patent measures freestream static pressure (steady in time) and total pressure (steady in time) but not acoustic pressure (waves) (time varying). The probe of the '997 patent is specifically designed for use in supersonic flow and may have drawbacks when used in wind tunnels for measuring subsonic velocities. A major contributor to these drawbacks is that each of the three separate sections has relatively sharp corners which more than likely create noise that hinders the accurate measurements of acoustic waves within fluids flowing at subsonic velocities.

Accordingly, an object of the present invention is to provide a new and improved acoustic sensor for use in measuring acoustic waves within a fluid flowing at subsonic velocities.

Another object of the present invention is to provide a sensor that may be inserted into the fluid flow without unnecessrily disturbing the freestream value of the fluid static pressure.

It is a further object of the present invention to provide an acoustic sensor used for accurately measuring acoustic waves within a fluid flow in the subsonic, supersonic, or transonic velocities.

SUMMARY OF THE INVENTION

The present invention is directed to a sensor used for measuring acoustic waves that travel through a fluid of interest at subsonic, supersonic or transonic velocities.

The acoustic sensor comprises an axisymmetric elliptical nose portion, a straight-sided cylindrical section, and an instrument for measuring unsteady pressure fluctuations. The nose section has a tip on one of its ends and a transition point on its other end. The straight-sided cylindrical section has a predetermined diameter (D), a predetermined length (l), and has one of its ends connected to the transition point. The instrument is located in the straight-sided cylindrical section in a cavity downstream from the transition point at a distance of about 3-4 times the diameter (D) of the straight-sided cylindrical section.

BRIEF DESCRIPTION OF THE DRAWINGS

FIG. 1 is composed of FIGS. 1(A) and 1(B) which respectively illustrate a partial side view and a rear view of a prior art acoustic sensor.

FIG. 2 is composed of FIGS. 2(A), 2(B), and 2(C), wherein FIGS. 2(A) and 2(B) respectively illustrate portions of a prior art sensor and a sensor of the present invention, and wherein

FIG. 3 is composed of FIGS. 3(A) and 3(B) which respectively illustrate a partial side view and a rear view of the acoustic sensor of the present invention.

FIG. 4 is composed of FIGS. 4(A) and 4(B) illustrating further details of the acoustic sensor of FIG. 3, in particularly, and more particularly, the location of its microphone.

FIG. 5 is composed of FIGS. 5(A) and 5(B) which respectively illustrate side and rear views of a second sensor of the present invention used for measuring fluid flowing in a wind tunnel at supersonic and transonic velocities.

DETAILED DESCRIPTION OF THE INVENTION

Referring to the drawings, wherein like reference numbers designate like elements, there it is shown in FIG. 1 a prior art acoustic sensor 100 which may be first described in order to more fully appreciate the acoustic sensor of the present invention. In general, the prior art sensor 100 has poor aerodynamic properties and suffers from the drawbacks of creating instabilities in the pressure of the fluid flowing past the tip of the sensor 100. These instabilities create unstable states in the flow of fluid which degrades the accuracy of measuring the acoustic waves traveling through this same flow.

Figure 1A:
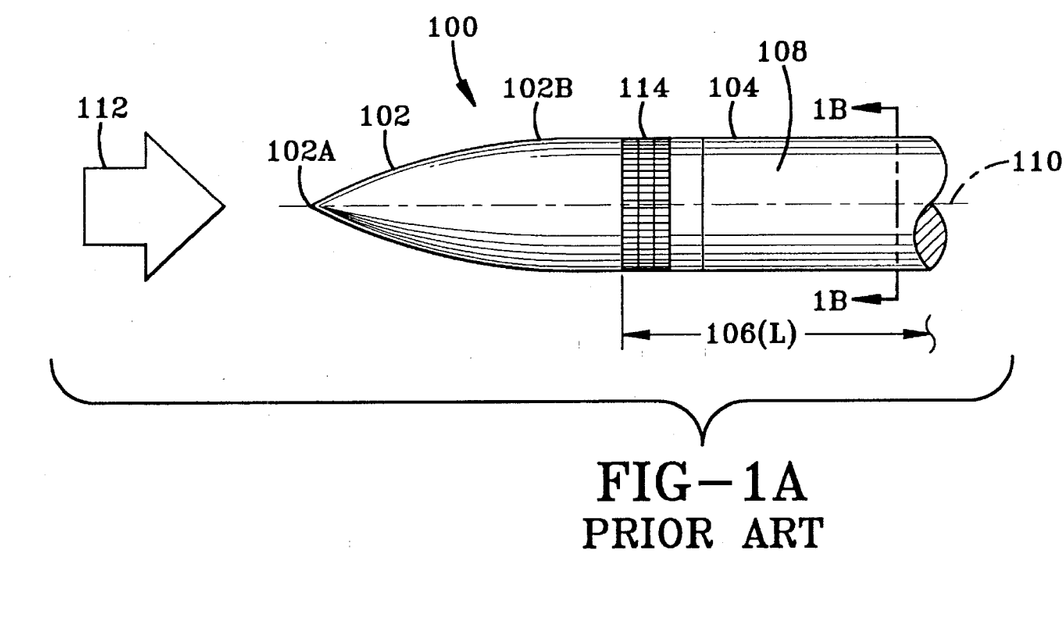
Figure 1B:
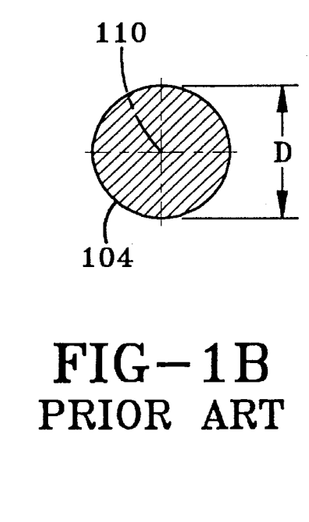

The prior art sensor 100 comprises a forebody 102, sometimes called a nose cone, having a tip 102A and a shoulder 102B. The sensor 100 further comprised a straight-sided cylindrical section 104 with a predetermined length 106(1). In actuality, the straight cylindrical section 104 is the outside casing of a microphone. The sensor 100 has provisions for mounting the microphone, having a diaphragm 108 (not shown), for measuring unsteady pressure fluctuations. As used herein, the term "straight-sided" is meant to distinguish section 104 from the nose cone 102 having a "sharp" shape. The section 104 is circular in cross section and has a diameter (D) and a center 110 both shown in FIG. 1(B), which is a view taken along line 1(B)—1(B) of FIG. 1(A). The sensor 100 is symmetrical about its center or axis 110 as shown most clearly in FIG. 1(A). The nose cone section 102, in particularly, tip 102A is positioned to intercept a fluid flow represented by bold arrow 112.

In operation, the tip 102A, because of its relatively sharp, point should be accurately aligned to be parallel to the flow of fluid. This is necessary because even small angles of incidence of the fluid intercepting the probe will create instabilities into the fluid being measured. Further, these instabilities occur within the general region of the screen 114 covering a cavity (not shown) where the diaphragm 108 of the microphone is located. Since the cavity is opened to the fluid flow by way of the screen, the static pressure inside the cavity becomes equal to the static pressure of the fluid flowing over the screen 114 and, thus, is subject to these produced instabilities. Furthermore, acoustic waves, now subjected to these instabilities, travel through the screen and into the fluid in the cavity and thereby, excite the diaphragm 108 to produce an electrical signal that is proportional to the acoustic waves traveling through the fluid being measured. However, such a measurement is hindered by the noise, to be described hereinafter, created by the instabilities produced by the interception of the sharp tip 102A with the flowing fluid 112. In addition to the sensitivity of the sensor 110 to small angles of incidence that create instabilities, the location of the screen 114 of the sensor 110 also suffers drawbacks and may be further described with reference to FIG. 2.

Figure 2A:
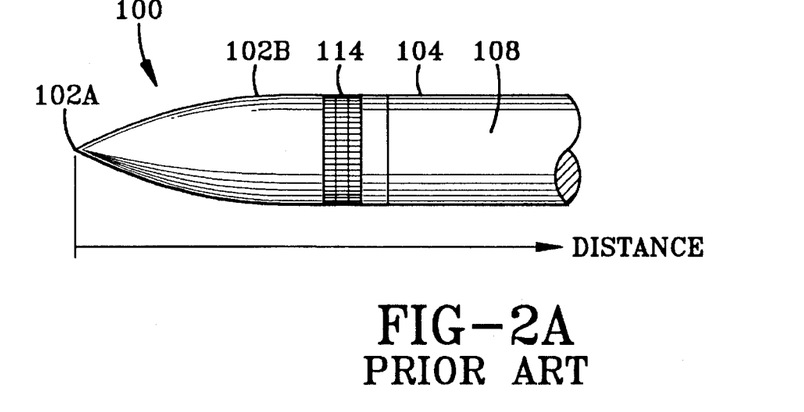
Figure 2B:
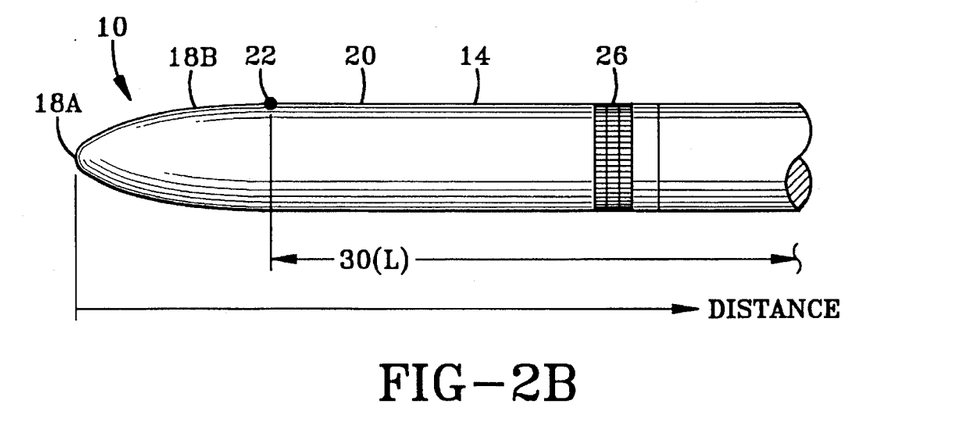
Figure 2C:
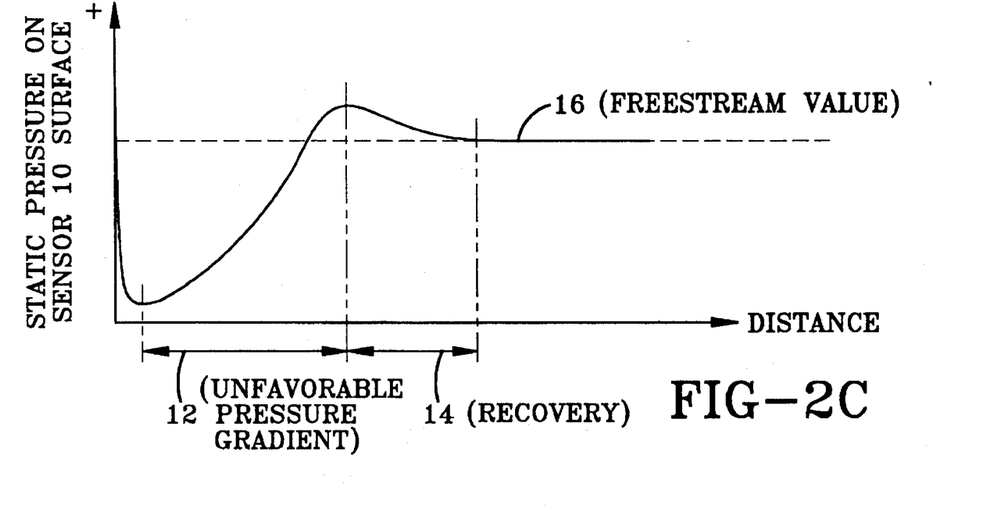
FIG. 2(C) illustrates the static pressure distribution along the sensor of FIG. 2(B).

FIG. 2 is composed of FIGS. 2(A), 2(B) and 2(C), wherein FIGS. 2(A) and 2(B) respectively illustrate the essential elements of the prior art sensor 100 and the sensor 10 of the present invention, and wherein FIG. 2(C) shows the static pressure distribution along the length of the sensor 10 and illustrates such static pressure by means of an Unfavorable Pressure Gradient region 12, a Recovery region 14, and a Freestream value 16. Although the pressure distribution along the sensor 100 is different than that shown in FIG. 2(C), primarily because of its sharp tip 102A, for the purpose of illustration, a simultaneous review of FIGS. 2(A) and 2(C) will reveal that the screen 114 of the prior art sensor 100 is not located at upper case Freestream value 16 but has a static pressure that is either higher or lower than the upper case Freestream value 16. As will be further discussed with reference to FIGS. 6 and 7, such a location of screen 114 causes inaccurate measurement of the acoustic waves flowing through the fluid due to high levels of background noise created by the sharp tip 102A. The present invention eliminates such disadvantages and may be further described with reference to FIG. 3.

In general, and as to be further described, the acoustic sensor 10 of FIG. 3 has proper aerodynamic properties such that it has the advantageous features such that its insertion into a fluid flow does not excite instabilities in the fluid flow or the microphone diaphragm, its blunt shaped nose section is relatively insensitive to small angles of incidence normally created by a non-parallel insertion of the sensor into the flow of the fluid or to turbulent fluctuation of the fluid, its static pressure at its point of measurement (location of its microphone diaphragm), is stable, and the performance of its measurement occurs before any large build up in the boundary layer of the flowing fluid is allowed.

The acoustic sensor 10 comprises a nose section 18 having a blunt tip 18A and a shoulder 18(B), a straight-sided cylindrical section 20, a transition point 22 where the shoulder 12B mates with the straight-sided cylindrical section 20, a microphone with a diaphragm 24 (not shown), and a screen 26 comprising a screen material covering the entrance to the microphone diaphragm 24. The microphone may be of a condensor or electret type or any other type of instrument that produces an electric signal that is proportional to the acoustic waves traveling through th fluid flow. Further, the screen may be of a continous material and attached to the cylindrical section 20 in such a manner so as to seal the enclosed microphone diaphragm 24 allowing the microphone diaphragm 24, a well as the sensor 10, to be submerged in a liquid fluid.

Figures 3A, 3B:
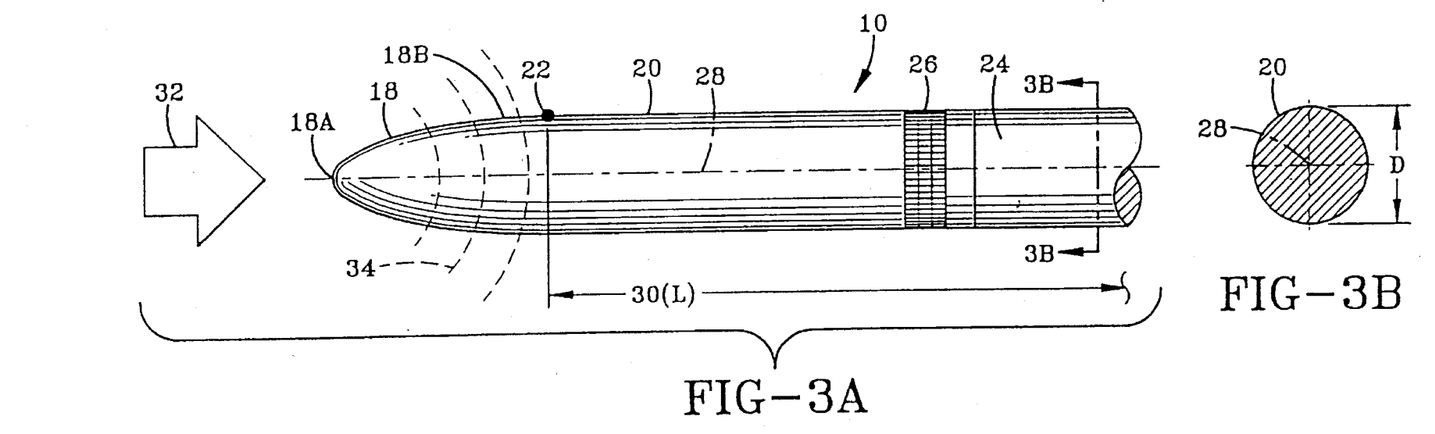

As been seen in FIG. 3(B), which is a view taken along line 3(B)—3(B) of FIG. 3(A), the straight-sided cylindrical section 20 preferably has a circular shape in cross section having a predetermined diameter (D) and a center or axis 28 which is shown most clearly in FIG. 3(A). The term "straight-sided" is used herein to distinguish section 20 from the "blunt" shaped tip 18A of sensor 10. The sensor 10 is symmetrical about the axis 28 and its cylindrical section 20 has a predetermined length 30(1) that starts at the transition point 22 and continues to the other end (not shown) of the cylindrical section 20.

The nose section 18, which may be either hollow or solid, is positioned to intercept a flow of fluid, represented by arrow 32, and preferably has a shape in cross section defined by of an ellipse with the major axis of the ellipse being along the axis of symmetry 28. The ellipse preferably has an eccentricity of about four (4), and has a minor axis having a length preferably equal to the predetermined diameter (D) of the cylindrical section 20. The transition point 22 is at a location where the sensor 10 transitions from a curved surface at the shoulder 18B to the straight-sided cylindrical portion 20. This transition point 22 may be defined by having the first derivatives of a geometric equations of the elliptical nose section 18 and the straight-sided cylindrical portion 20 set equal to each other.

Alternatively, instead of using an ellipse, an arrangement of fresnel curves 34, shown in phantom, may be used to construct a transition from the nose section 18 to the cylindrical section 20. With such an arrangement 34, the transition point 22 may be defined by having the second derivatives of the geometrical equations of the fresnel curves 34 and the straight-sided cylindrical section 20 set equal to each other. In any of these embodiment, the selection of the proper transition point insures that the surface of the acoustic sensor 10 is a smooth and continuous so as to not introduce nor magnify, as little as possible, any instability that may already be present in the fluid flow. Furthermore, the material of the sensor 10 is selected to produce a smooth surface having a low coefficient of friction. The acoustic sensor 10 because of its nose section 18 does not excite any instabilities in the fluid flow, represented by arrow 32, and because of its location of its screen 26, its microphone diaphragm 24 is not effected by any unstable pressures when measuring the acoustic wave flowing through the fluid. Both of these features may be further described with reference back to FIG. 2.

With regard to FIG. 2, FIGS. 2(B) and 2(C) are related to the acoustic sensor 10 and FIG. 2(C) has a Y coordinate showing the static pressure on the sensor 10 and an X coordinate (also corresponds to the X coordinate of FIG. 2(B)) showing the variation of the static pressure along the distance of the sensor 10. As seen in FIG. 2(C), the static pressure on the sensor 10 is segmented into the three (3) regions previously mentioned: (1) the Unfavorable Pressure Gradient region 12; (2) the Recovery region 14; and (3) the Freestream value 16.

In general, the surface of the acoustic sensor 10, in particular, nose cone 18 is selected so that the fluid that it intercepts closely clings (sometimes called "attaching") to the tip 18A without producing vortices or fluctuating disturbances that propagate downstream. The disturbances are not produced even at small angles of incidence between the fluid and the intercepting tip 18A. The flow intercepting the nose cone 18 advantageously remains attached to the surface of the sensor 10 as it accelerates around the tip 18A and follows the contour of the remaining surface of sensor 10. As the fluid flow passes the shoulder 18B, in particular the transition point 22, the velocity of the flow decreases and static pressure increases, creating the Unfavorable Pressure Gradient region 12 where the flow is in an unstable state, and, accordingly, small fluctuations in the flow may be amplified and produce relatively large fluctuations downstream. Without the benefits of the present invention, turbulence or even separation of the fluid may occur in this region 12. The transition of the sensor's 10 surface from curved (shoulder 18B) to straight (cylindrical portion 20) also occurs in this region 12 and the surface of the sensor 10 associated with this region 12 is made as smooth as possible in the present invention so as to avoid introducing any instabilities. When the flow reaches the constant diameter section (starting at transition point 22) the pressure slightly over shoots (shown by Recovery region 14) the Freestream value 16 and then settles down and becomes stable at the Freestream value 16. This process is called recovery and is also associated with a static pressure gradient on a surface of the nose cone 18.

From FIGS. 2(B) and 2(C), it is seen that the cross-over point from the Unfavorable Pressure Gradient region 12 to the Recovery region 14 occurs at the transition point 22 of sensor 10. Furthermore from FIGS. 2(B) and 2(C), it is seen that the acoustic sensor 10 locates the screen 26, which is the point of measuring the acoustic waves traveling through the flow, at neither the Unfavorable Pressure Gradient region 12 nor the Recovery region 14, but rather at a location where the Freestream value 16 exists. At this Freestream value 16, the acoustic pressures are extremely small in comparison with the static pressure. Since this is true, even small changes in the static pressure would contaminate the quality of the acoustic signal being measured by sensor 10. Furthermore, it is important that this measurement of the acoustic waves traveling in the fluid occur as quickly as possible after the Recovery region 14, so that the boundary layer of the fluid flow does not have a chance to grow and introduce large amounts of turbulence noise into the measurement system. After the flow has stabilized, the flow is directed to the screen 26 covering a cavity where the microphone diaphragm 24 is located. As previously mentioned, since the cavity is opened, the static pressure inside the cavity equals the static pressure of the flow over the screen. Acoustic waves travel through the screen, enter the cavity and excites the diaphragm 24 to produce the electrical signal that is proportioned to the acoustic signal. Unlike prior art devices, the electric signal now developed is substantially free of any noise and, thus, is an accurate measurement of the acoustic waves flowing in the fluid. The desired location of the screen 26 and the microphone diaphragm 24 may be further described with reference to FIG. 4.

Figure 4A:
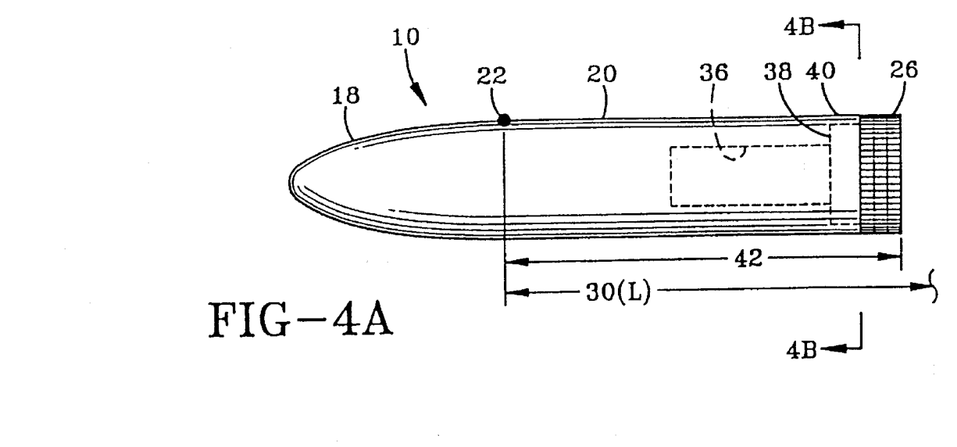
Figure 4B:
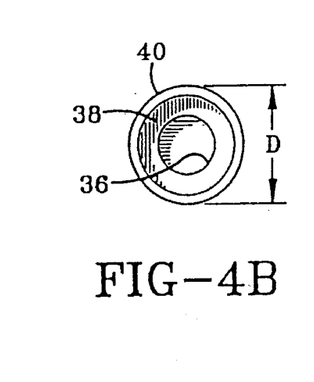
Figure 5A:
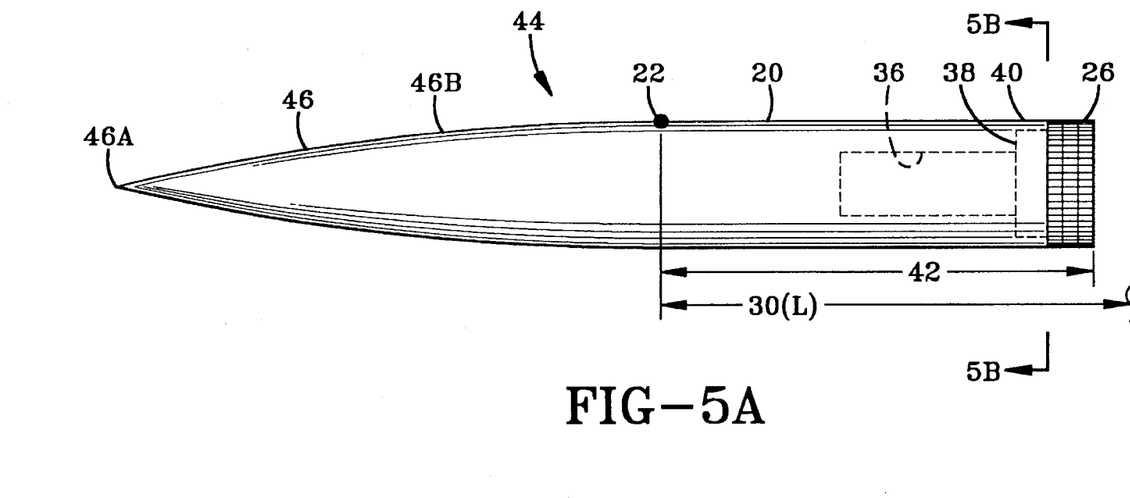
Figure 5B:
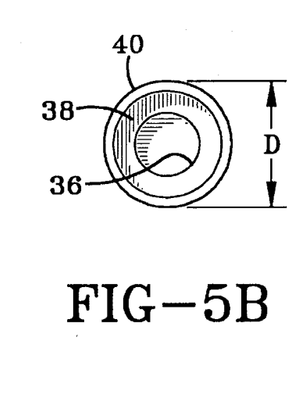

FIG. 4 is composed of FIGS. 4(A) and (B), wherein FIG. 4(A) shows the screen 26 as being located behind a threaded cavity 36 having a shoulder 38 which preferably encircles the circumference 40 of one end of the acoustic sensor 10. The cavity 36, shoulder 38, and circumference 40 are further shown in FIG. 4(B), which is a view taken along line 4(B)—4(B) of FIG. 4(A). The cavity 36 serves as the housing for receiving the screen/cavity which is then fixed in position relative to the microphone diaphragm 24. The screen/cavity which is then connected to the straight-sided cylindrical section 20 has a related diameter (D) which, in turn, is interrelated to the length 30(l) and to the desired location of the screen 26. More particularly, as shown in FIG. 4(A), the screen 26 is located along the length 30 downstream from the transition point 20 at a distance 42 that corresponds to a range of between 3 to 4 times the diameter (D) of the cylindrical setion 20. The placement of the screen 26 at this distance 42 eliminates the presence of unwanted noise during the measurement of the acoustic waves. The arrangement 10 shown in FIG. 4(A) is particularly suited for measurement of subsonic flow, whereas, the arrangement of a sensor 44 is particularly suited for measurement of supersonic flow and is shown in FIG. 5.

The sensor 44 embodies many of the elements of sensor 10 and uses like reference numbers to indicate this commonality. Sensor 44 is different than sensor 10 in that it has a nose cone 46 which has a relatively sharp tip 46A and, unlike sensor 10, its shoulder 46B is also sharply tapered. The sharp tip 46A and sharply tapered shoulder 46B accommodate the sensor 46 to allow for its non-disturbing insertion into subsonic and also into transonic fluid flow, whereas its other elements sharply reduces the noise that might otherwise effect the measurement of the acoustic waves contained in the flow of the fluid.

Figure 6:
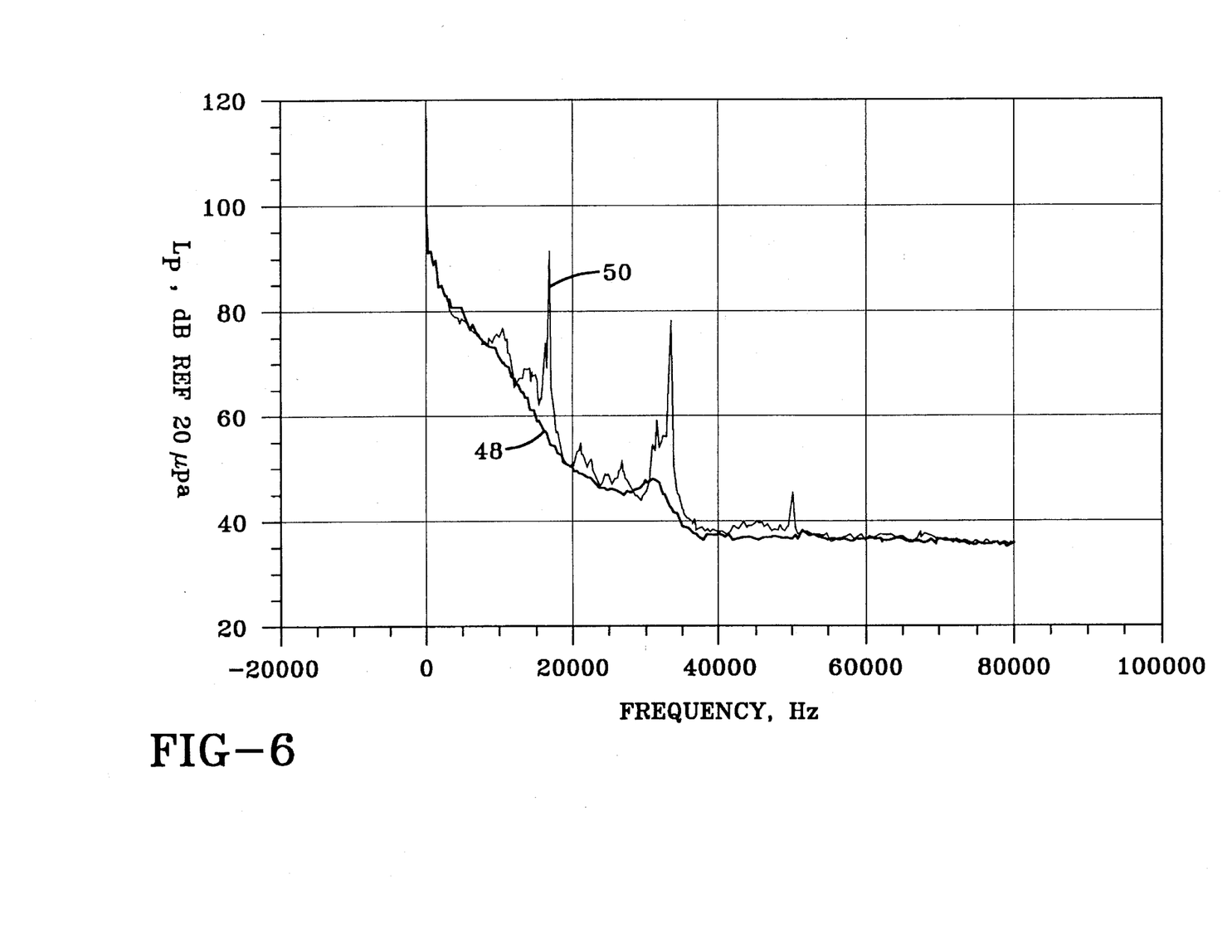
FIG. 6 illustrates a comparison of the noise associated with a prior art sensor and the sensor of the present invention occurring during the noise measurement of fluid flowing at a velocity of 160 knots.
Figure 7:
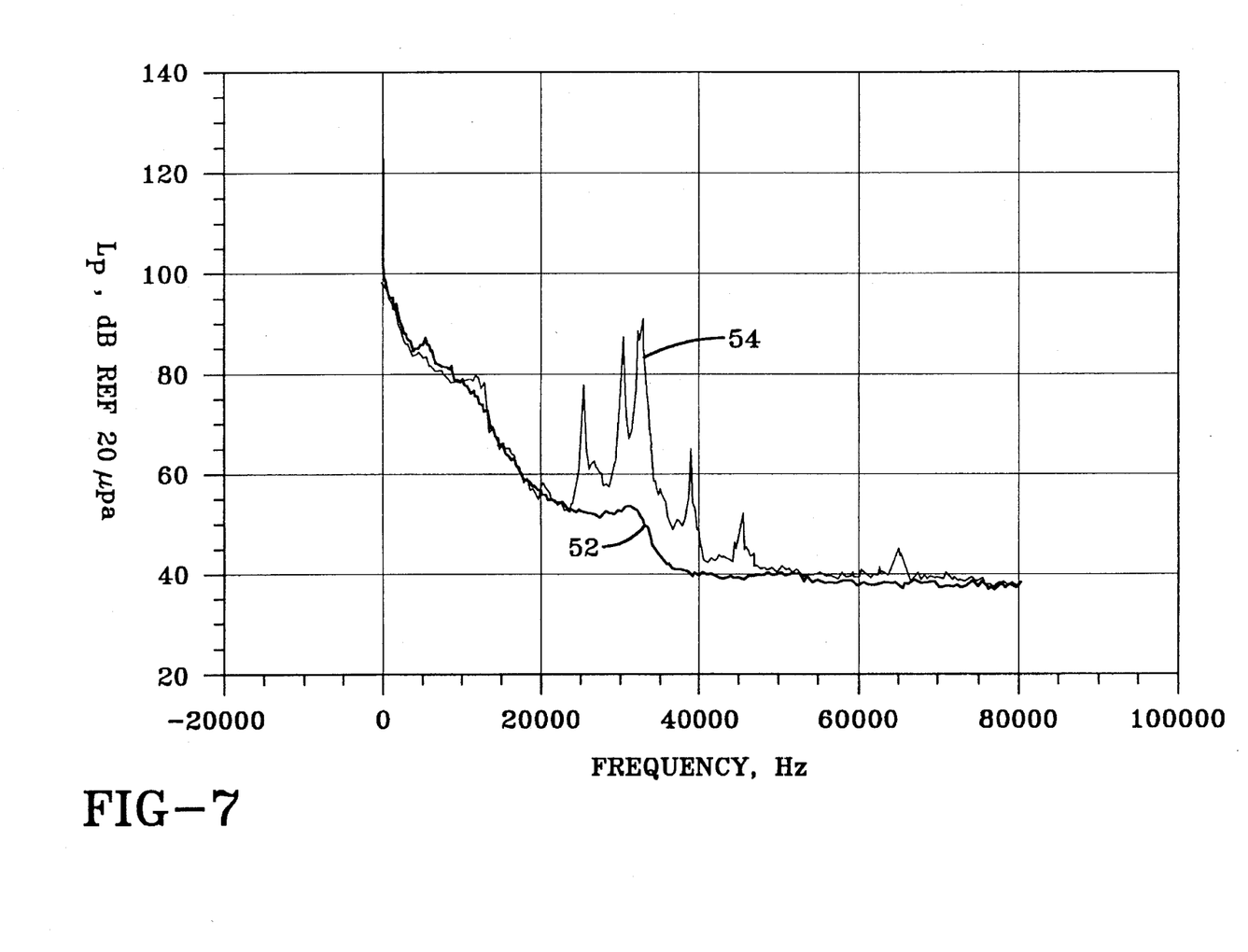
FIG. 7 illustrates a comparison of the noise associated wih a prior art sensor and the sensor of the present invention occurring during the noise measurement of fluid flowing at a velocity 200 knots.

In the practice of this invention, comparative testing was performed relative to the prior art acoustic sensor 100 shown in FIG. 1 and FIG. 2(A) and the sensor 10 of the present invention. The results of the testing are illustrated in FIGS. 6 and 7, wherein FIG. 6 shows the comparison data of the flow noise occurring at a velocity 160 knots in a wind tunnel, and FIG. 7 shows the flow noise occurring at a velocity of 200 knots in a wind tunnel. Both FIGS. 6 and 7 have a X axis, given in frequency per hertz (Hz) as shown, whereas FIG. 6 has a Y axis showing the level (Lp) of noise, given in decibel (dB) referenced to 20 μpa, and, similarly, FIG. 7 has a Y axis showing the level (Lp) of noise, given in dB referenced to 20 μpa.

FIG. 6 shows two plots 48 and 50 which are respectively representative of the results obtained by the use of the present invention (sensor 10) and the results obtained by the use of the prior art (sensor 100). As seen in FIG. 6, high levels of peak-like noise of plot 50 occur in the range of from about 10,000–80,000 Hz, whereas plot 48 is devoid of any high-level peak-like noise.

FIG. 7 is similar to FIG. 6 and shows plots 52 and 54 which are respectively indicative of the results obtained from the use of acoustic sensor 10 of the present invention and those obtained by the use of the prior art acoustic sensor 100. As seen in FIG. 7, the plot 54 has high levels of discrete frequency noise in the range of about 20,000–80,000 Hz, whereas the plot 52 shows relatively low noise levels throughout its plot and is devoid of any high level noise peaks.

In addition to the background noise reduction as evidenced by FIGS. 6 and 7, the sensor 10 of the present invention has also been witnessed to reduce the levels of broadband background noise below 20 kHz.

It should now be appreciated the practice of the present invention provides an acoustic sensor 10 that is insertable into a flowing fluid to measure the acoustic waves therein. After such insertion, the operation of the sensor allows a static pressure of the fluid flow to seek and return to its freestream value and stabilize so that no disturbances are present at diaphragm of the microphone to mistakenly cause inaccurate measurements of the acoustic waves flowing into the fluid. Further, it should be appreciated that the present invention also provides for a sensor 10 that need not be concerned with the errors created by small angles of incidence that have plagued prior art devices.

What I claim is:

1. An acoustic sensor for measuring acoustic waves contained in a flowing fluid, said sensor comprising:
    (a) an axisymmetric elliptical nose section having a tip on one of its ends and a transition point on its other end, said elliptical nose section having a shape in cross section defined by a plurality of fresnel curves and having a major axis serving as the axis of symmetry of said axisymmetric nose section;
    (b) a straight-sided cylindrical section having a predetermined diameter (D), a predetermined length (l) and one of its ends connected to said transition point; and
    (c) an instrument for measuring unsteady pressure fluctuations and located in a cavity downstream from said transition point at a distance corresponding to about 3 to 4 times said diameter.

2. An acoustic sensor according to claim 1, wherein said transition point is defined by having the second derivatives of the geometric equations of said plurality of fresnel curves and said straight-sided cylindrical section being set equal to each other.

3. An acoustic sensor for measuring acoustic waves contained in a flowing fluid, said sensor comprising:
    (a) an axisymmetric nose section having a tip on one of its ends and a transition point on its other end, said tip being pointed and said fluid flow being at a supersonic speed;
    (b) a straight-sided cylindrical section having a predetermined diameter (D), a predetermined length (l) and one of its ends connected to said transition point; and
    (c) an instrument for measuring unsteady pressure fluctuations and located in a cavity downstream from said transition point at a distance corresponding to about 3 to 4 times said diameter.

4. An acoustic sensor for measuring acoustic waves contained in a flowing fluid, said sensor comprising:
    (a) an axisymmetric nose section having a tip on one of its ends and a transition point on its other end, said tip being pointed and said fluid flow being at a transonic speed;
    (b) a straight-sided cylindrical section having a predetermined diameter (D), a predetermined length (l) and one of its ends connected to said transition point; and
    (c) an instrument for measuring unsteady pressure fluctuations and located in a cavity downstream from said transition point at a distance corresponding to about 3 to 4 times said diameter.

* * * * *